UNITED STATES PATENT OFFICE.

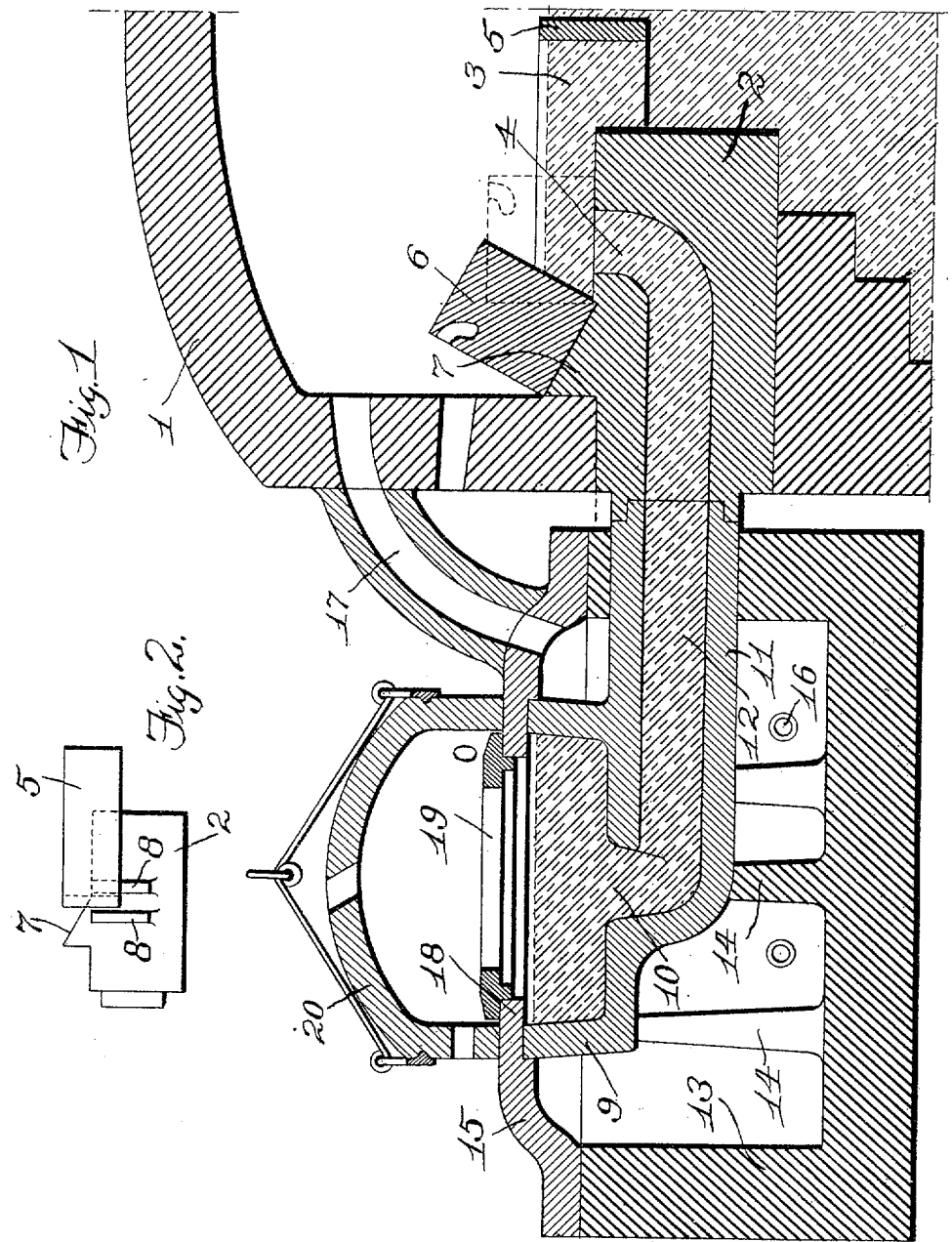

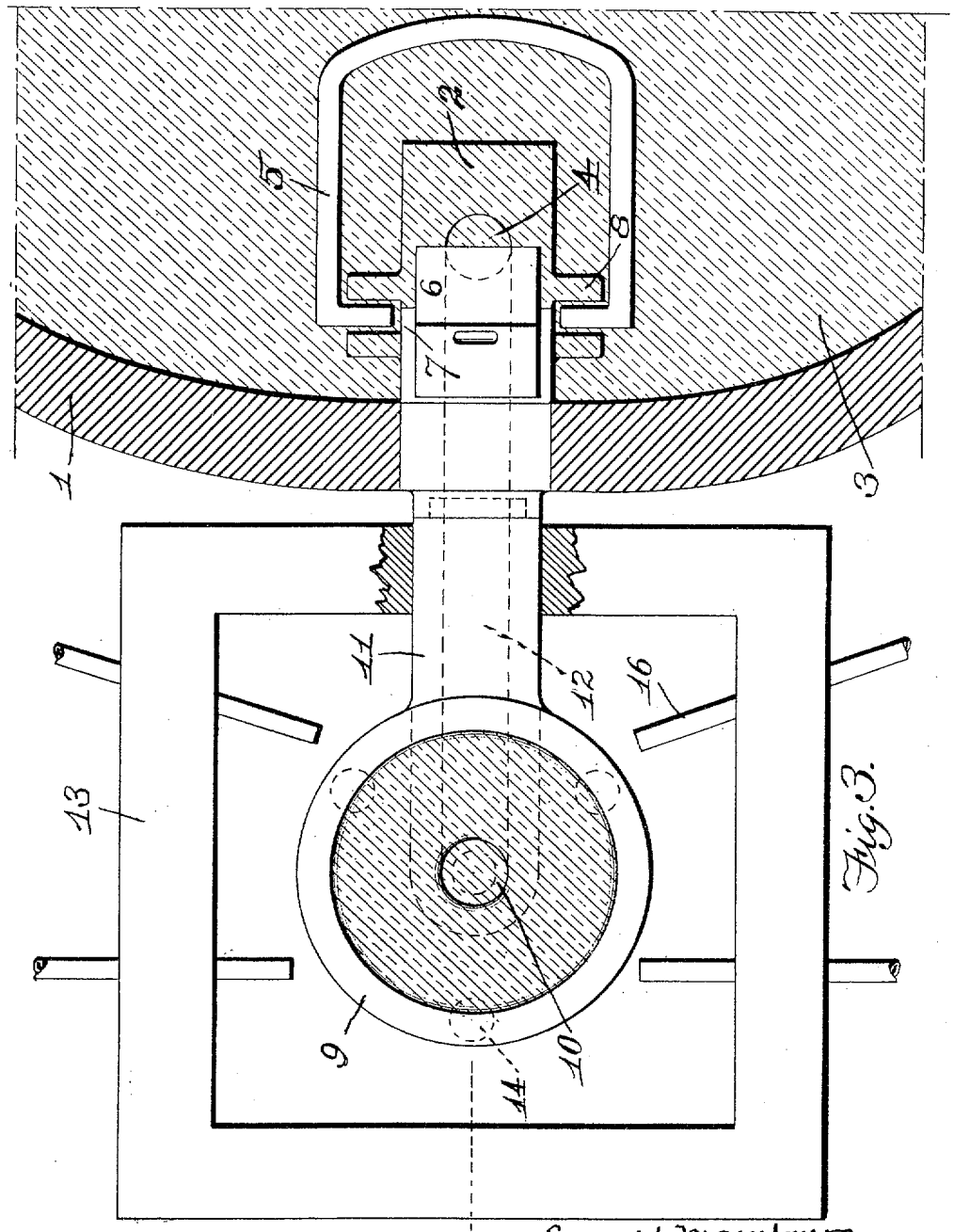

LEOPOLD MAMBOURG AND ULGISSE HOUZE, OF MOUNT VERNON, OHIO, ASSIGNORS TO THE MAMBOURG GLASS SHEET MACHINE COMPANY, OF MOUNT VERNON, OHIO.

GLASS-DRAWING APPARATUS.

970,633.  Specification of Letters Patent.  Patented Sept. 20, 1910.

Application filed December 17, 1908. Serial No. 467,931.

*To all whom it may concern:*

Be it known that we, LEOPOLD MAMBOURG and ULGISSE HOUZE, citizens of the United States, residing at Mount Vernon, Knox county, Ohio, have invented certain new and useful Improvements in Glass-Drawing Apparatus, of which the following is a specification.

In the manufacture of sheet glass by the process of the machine drawing of cylindrical or other shells from a continuously supplied pot, very serious difficulties present themselves owing to the unsatisfactory or variable quality of the glass drawn from the tank and owing to the variations in the condition of the glass at different points in the pot from which the drawing is done, the latter conditions particularly bringing about differences in the thickness of the shell at various points around it. Our invention looks to the avoidance of these evils.

Our invention will be readily understood from the following description taken in connection with the accompanying drawings in which:—

Figure 1 is a vertical section of an apparatus illustrating our invention: Fig. 2 a side elevation of the tank nose block: and Fig. 3 a plan of the apparatus, with the furnace roof and the pot cover removed and with the tank in horizontal section. Fig. 2 is upon a smaller scale than the other figures.

In the drawings:—1, indicates the tank: 2, a nose-block in the wall thereof: 3, the molten glass in the tank with its level maintained somewhat above the top of the nose block: 4, the tank outlet downward into the nose-block, this outlet being disposed some distance from the wall of the tank: 5, a float skimmer disposed around the inner end of the block, this skimmer being U-shaped and having inturned ends: 6, a stopper-block adapted to be placed down over and close the outlet in the nose-block: 7, an inclined portion of the top of the nose-block at one side of the outlet, this inclined portion being adapted to sustain the stopper-block when the same is tipped up to idle position: 8, lugs projecting outwardly from the sides of the nose-block and having the inturned ends of the float skimmer engaging freely between them: 9, the pot from which the glass is to be drawn, this pot being shallow and having its rim disposed at a level somewhat higher than that of the glass in the tank: 10, the inlet to the pot, the same being disposed symmetrically with reference to the wall of the pot, the inlet being illustrated as entering the pot at the center of the floor of the pot: 11, a nozzle connecting the pot with the upper portion of the nose-block of the tank: 12, a conduit extending through the nozzle and nose-block and connecting tank outlet 4 with pot inlet 10: 13, a furnace surrounding the pot and nozzle: 14, piers disposed within the furnace and serving to support the pot: 15, the roof of the furnace: 16, gas burners for heating the furnace: 17, the outlet flue from the furnace: 18, the rim of the furnace roof, this rim projecting somewhat inwardly of the rim of the pot: 19, a reducing ring adapted to be placed over the pot, within the opening in the furnace roof and serving to reduce the size of the opening over the pot in case comparatively small shells are to be drawn: and 20, the removable roof of the pot.

The drawing device to be employed in connection with our improved apparatus may be of any usual or suitable kind and operated in the usual manner.

It has been observed that in a tank of molten glass the glass at the tank wall is always in a condition different from and less favorable than that of the glass at some distance from the wall. In our system the tank outlet for the glass is downward and at a distance from the wall thus permitting the withdrawal of the glass under its most favorable conditions. The float skimmer resists the approach of surface material to the outlet and confines the withdrawal of glass to that entering the skimmer upwardly on its way to the outlet. When the supply of glass to the outlet is to be shut off then the stopper-block is to be tipped down over the outlet, which can be done by the use of a suitable implement inserted through a proper opening in the tank wall or roof.

The glass is constantly maintained in the pot at the same level as in the tank, and the glass received by the pot from the tank enters the pot in a symmetrical manner so that the glass is under the same condition all the way around the pot. A shell drawn from the glass in this condition will be of uniform thickness all the way around it. The furnace keeps the pot and its contained glass always at proper drawing temperature while the drawing is being done. In drawing large shells the reducing ring 19 is omitted, and it will of course be understood that pot-cover 20 will be absent when a shell is being drawn.

When a shell has been drawn and pulled loose or cut loose from the glass in the pot there will be left on top of the glass in the pot a quantity of glass at comparatively low temperature. The pot cover is then to be employed and, by means of the heat of the furnace, aided if needed by gas burners inserted through ports in the pot roof, all the glass in the pot is to be brought to the proper temperature, after which the pot roof is to be removed and another drawing proceeded with.

It is to be understood that the drawing illustrates but a single exemplification of our invention. We have simply sought to describe the principle of our invention in the best form in which we contemplate applying that principle.

We claim:—

1. Glass drawing apparatus comprising, a tank, a pot, and a conduit leading from the tank to the pot, the inlet from the tank to said conduit being downward and at a distance from the wall of the tank, combined substantially as set forth.

2. Glass drawing apparatus comprising, a tank, a pot, a nose-block disposed in the wall of the tank and projecting thereinto and having a downward outlet at a distance from the wall of the tank, and a conduit leading from said outlet to the pot, combined substantially as set forth.

3. Glass drawing apparatus comprising, a tank, a pot, a nose-block disposed in the wall of the tank and projecting thereinto and having a downward outlet at a distance from the wall of the tank, a conduit leading from said outlet to the pot, and a stopper-block resting on said nose-block and adapted to be placed over said downward outlet, combined substantially as set forth.

4. Glass drawing apparatus comprising, a tank, a pot, a nose-block disposed in the wall of the tank and projecting thereinto and having a downward outlet at a distance from the wall of the tank and having a sloping top surface at one side of said outlet, a conduit leading from said outlet to the pot, and a stopper-lock resting on said sloping surface and adapted to be tipped downwardly over said downward outlet, combined substantially as set forth.

5. Glass drawing apparatus comprising, a tank, a pot, a nose-block disposed in the wall of the tank and projecting thereinto and having a downward outlet at a distance from the wall of the tank, a float skimmer held by said nose-block and inclosing said downward outlet, and a conduit leading from said outlet to the pot, combined substantially as set forth.

6. Glass drawing apparatus comprising, a tank, a pot, a nose-block disposed in the wall of the tank and projecting thereinto and having a downward outlet at a distance from the wall of the tank, lugs projecting from the sides of said block, a U-shaped float skimmer inclosing said outlet and having inturned ends engaging between said lugs, and a conduit leading from said outlet to the pot, combined substantially as set forth.

7. Glass drawing apparatus comprising, a tank, a furnace, a pot supported within the furnace, a conduit leading from the tank to the pot, a furnace roof resting on the rim of the pot and having an opening over the pot, and a reducing ring adapted to engage said opening, combined substantially as set forth.

8. Glass drawing apparatus comprising, a tank, a nose-block disposed in the wall of the tank and projecting thereinto and having a downward outlet at a distance from the wall of the tank, a furnace alongside said tank, piers upstanding from the floor of the furnace, a pot supported within the furnace on said piers, a nozzle connected with the bottom of the pot and with the outer portion of said nose-block, a conduit leading from said outlet through the nose-block and nozzle and to an inlet symmetrically disposed with reference to the wall of the pot, a furnace roof engaging over the rim of the pot and having an opening over the pot, a float skimmer at said outlet from the tank, and a stopper-block supported by the nose-block and adapted to close said outlet, combined substantially as set forth.

9. Glass drawing apparatus comprising a tank, a nose-block disposed in and forming a portion of the wall of the tank and projecting thereinto and having a downward outlet at a distance from the wall of the tank, and a conduit leading from said outlet.

10. Glass drawing apparatus comprising a tank, a nose-block disposed in the wall of the tank and projecting thereinto and having a downward outlet at a distance from the wall of the tank, a conduit leading from said outlet, and a stopper-block resting on said nose-block and adapted to be placed over said downward outlet.

11. Glass drawing apparatus comprising a tank, a nose-block disposed in the wall of the tank, projecting thereinto and having a downward outlet at a distance from the wall of the tank, and a skimmer associated with the nose-block and inclosing said downward outlet.

12. Glass drawing apparatus comprising a tank, a pot, a conduit leading from the tank up through the bottom of the pot, the outlet from the tank to said conduit being downward and at a distance from the wall of the tank, and a stopper associated with said outlet.

13. Glass drawing apparatus comprising in combination, a tank, a pot, a conduit leading from the tank to the pot, the outlet from the tank to said conduit being downward and at a distance from the wall of the tank, and a skimmer associated with the outlet to said conduit.

14. Glass drawing apparatus comprising, a tank, a nose-block disposed in the wall of the tank, projecting thereinto, and having a downward outlet at a distance from the wall of the tank, a conduit leading from said outlet, and a stopper-block resting on said nose-block and adapted to be placed over said downward outlet.

15. In combination, glass drawing apparatus comprising, a tank, a nose-block projecting into the tank and having an outlet therein, lugs projecting from the sides of said block, and a float skimmer inclosing said outlet and having inturned ends engaging between the lugs.

16. Glass drawing apparatus comprising, a tank, a nose-block disposed in the wall of the tank, projecting thereinto, and having a downward outlet at a distance from the wall of the tank, a furnace, a pot supported within said furnace, a nozzle connected with the bottom of the pot and with the outer portion of the nose-block, and a conduit leading from said outlet through the nose-block and nozzle to an inlet symmetrically disposed with reference to the wall of the pot.

17. Glass drawing apparatus comprising, in combination, a tank, a pot, a conduit leading from the tank to the pot, a skimmer in the tank inclosing the entrance to said conduit, and a stopper associated with said conduit entrance.

LEOPOLD MAMBOURG.
ULGISSE HOUZE.

Witnesses:
HENRY W. JENNINGS,
NUTER MAMBOURG.